United States Patent [19]

Utley

[11] Patent Number: 4,710,616

[45] Date of Patent: Dec. 1, 1987

[54] MULTI-STATION DATA COLLECTION SYSTEM

[75] Inventor: David L. Utley, Salt Lake City, Utah

[73] Assignee: National Transdata Systems, Inc., Murray, Utah

[21] Appl. No.: 869,234

[22] Filed: Jun. 2, 1986

[51] Int. Cl.<sup>4</sup> .............................................. G06K 7/10
[52] U.S. Cl. ..................................... 235/472; 235/454
[58] Field of Search ................................ 235/454, 472

[56] References Cited

U.S. PATENT DOCUMENTS 4,471,218  9/1984  Culp ..................................... 235/454

*Primary Examiner*—Harold I. Pitts
*Attorney, Agent, or Firm*—M. Reid Russell

[57] ABSTRACT

A data collection system for providing individual work stations data from a number of work stations, up to fifteen (15) that are included in a work or shop area of up to a four hundred (400) foot radius. The system utilizes a production document generated for each work station that shows job task information in both English and corresponding bar codes and is for optical reading by a manually operated data entry terminal at each work station that can store that information for later transmittal to a network controller that receives and stores that information for transmittal to a main frame computer.

8 Claims, 5 Drawing Figures

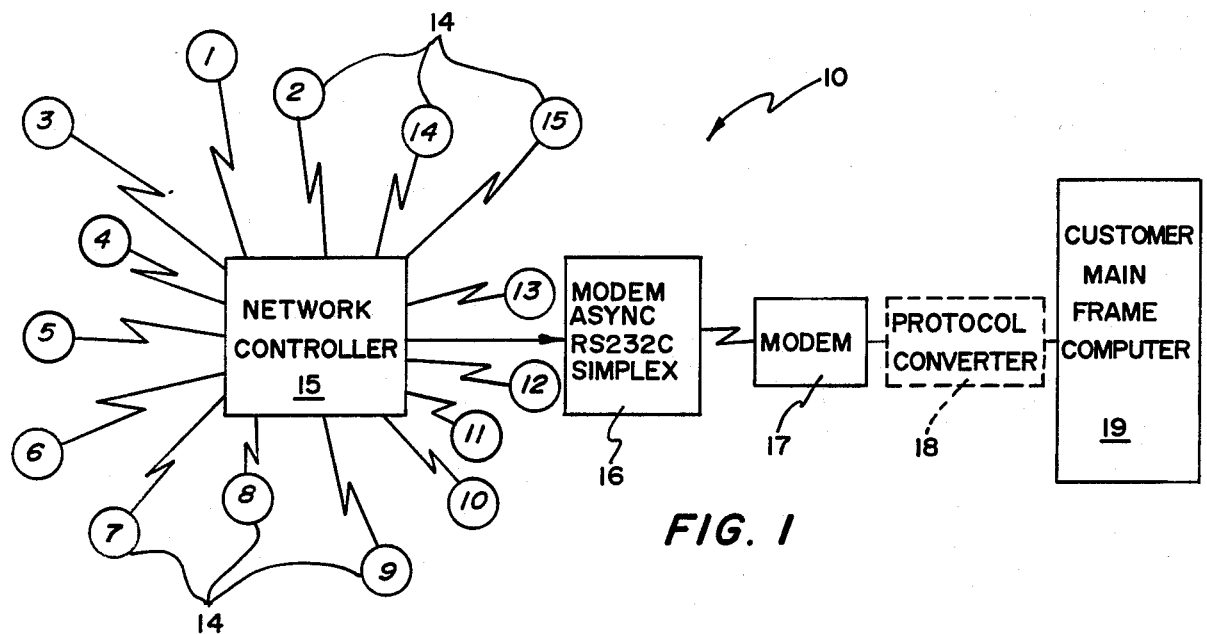
FIG. 1
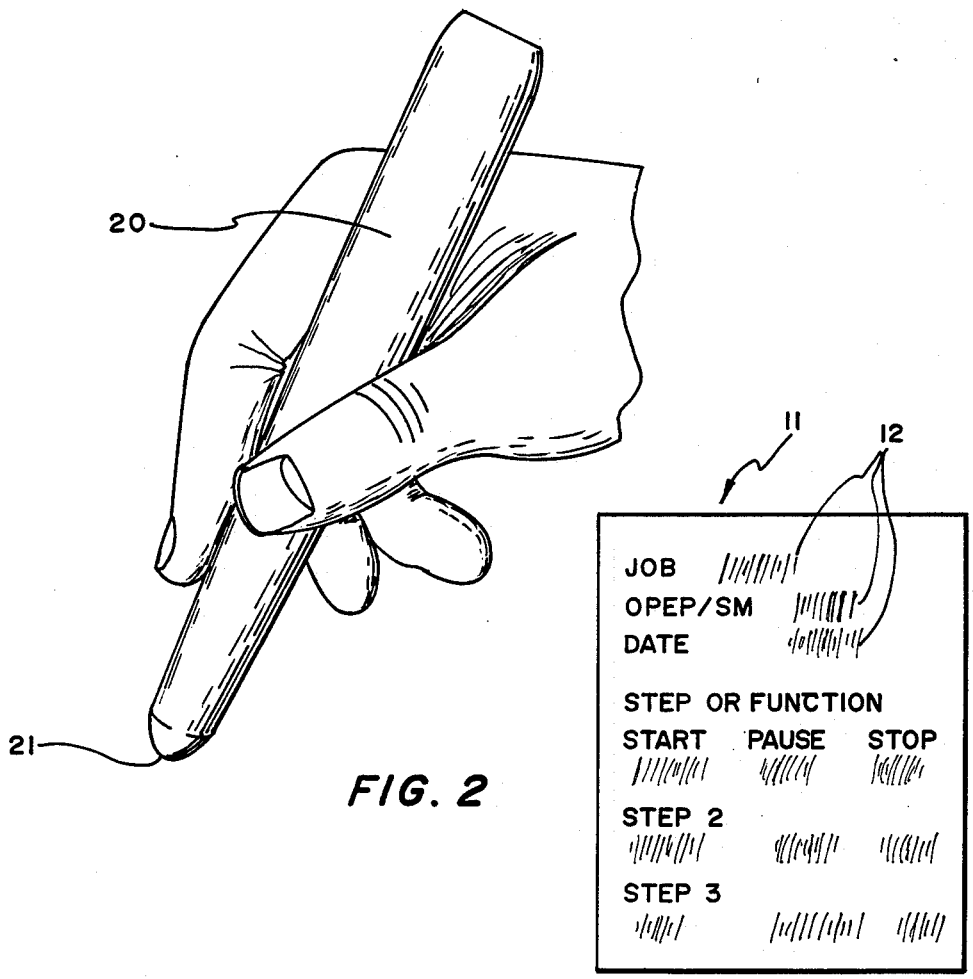
FIG. 2
FIG. 1A

MULTI-STATION DATA COLLECTION SYSTEM

BACKGROUND OF THE INVENTION

1. Field of the Invention

The present invention relates to data collection systems and, more particularly, to a data collection system for a network of work stations each with a variable data entry terminal connected to a processing controller that is, in turn, linked to a main frame computer.

2. Prior Art

In past years, the capabilities of computers to handle large amounts of data has grown dramatically while the cost of computing has decreased. Yet, the ability to interface various computers effectively to both keep track of and to control work place operations has not followed suit. To date, more attention has been placed on developing computing capabilities of main frame or central computers than has gone into providing for an efficient and effective way for feeding information from a multitude of points or sources to such computer. Certainly, once information has been received for handling at such main frame computer, the uses such information can be put to are multitudeness. The present invention therefore deals with a system for efficiently and effectively sequentially or simultaneously receiving data from a multitude of work stations within a defined area for processing and transmitting that information to such main frame computer. The system is an improvement over earlier hardwire systems that are still prevalent and include wire hookups with bulky and cumbersome terminals linked to a computer.

That a need exists for rapidly and accurately recording data at a work station for later processing and transmission was recognized in a recent patent by Culp, U.S. Pat. No. 4,471,218, that teaches a portable data entry terminal. The Culp device includes a bar code optical sensor for reading bar codes and provides for storage of data for processing and transmission. This data entry terminal is preferred for use in the system of the present invention. Another recently issued patent by Cahn, U.S. Pat. No. 4,389,642, provides for handling input information from a multiple of stations. This patent teaches a device having a capability for receiving a number of inputs through separate entry ports with appropriate circuitry for sampling and storing those inputs and transferring them as a discreet output through a modem or like device that connects to main frame computer. The digital matrix switching device of the Cahn patent is preferred for use as the network controller of the system of the present invention.

The system of the present invention provides data entry terminals that are capable of reading bar codings on a work order document and for passing that information to a digital switching matrix that is capable of handling and routing a number of simultaneous or sequential inputs from a plurality of such entry terminals. The system thereby provides, within a defined work area having a number of individual stations therein, for controlling work operations with a main frame type computer without a necessity for inputing information at fixed consoles, keyboards, or the like. The system of the present invention, unlike earlier systems that have employed such consoles and hardwired arrangements, provides a mobility to the worker or supervisory person at each station of the network that can include as many as fifteen (15) separate stations within a certain radius of operation. The system of the present invention, unlike earlier arrangements, provides a capability for job tracking, cost analysis and estimates, material control, scheduling, employee productivity evaluation, job costing, and the like at a main frame computer. Where earlier systems were fixed in place and therefore were often in the way and subject to contamination that is inherent in a shop floor work area, the present invention provides a mobile controller that is maintained by a single operator and is therefore not subject to many of the perils and pitfalls of such earlier systems.

SUMMARY OF THE INVENTION

It is a principal object of the present invention in a multi-station data collection system to provide an arrangement for collecting data inputs from a network of a number of work stations arranged within a certain work area, the data inputs gathered as bar code readouts for receipt, storage, and handling at a controller network that processes that information for ultimate transmission to a main frame computer system for storage and handling.

Another object of the present invention is to provide a data collection system that gathers information from different stations within a work area utilizing bar code reading devices, and provides for processing of that data for re-transmission to a network controller that will simultaneously handle inputs from a number of stations and processes that information for storage and ultimate transfer to a main frame computer, the entire system operating essentially without manual input except for an operator moving an optical sensor over select bar code groupings on a work order document.

Still another object of the present invention is to provide a system where a number of stations in a work area can sequentially or simultaneously communicate with a controller network during job performance, that communication involving an operator moving an optical sensor over select lines of a bar coded work order, the system linked ultimately to a main frame computer to provide data flow thereto concerning job status and progress for computing job tracking, standardizing costs, material control, scheduling, employee evaluation, job costing, and like information.

Still another object of the present invention is to provide a data collection system that can be operated from individual work stations in a work area network that provides data on job or task progress at that work station as the individual jobs or tasks are performed for compilation, storage and transmission to a main frame computer, the computer thereby maintaining an awareness of the work status at each station.

In accordance with the above objects, the present invention in a multistation data collection system includes at each of a number of work stations within a work area or shop floor area network a hand held portable data entry terminal that includes an optical sensor for reading bar codes and provides for recording those readings in a memory. An operator at each work station, on receipt of a bar coded work order document, moves the optical sensor of that data entry terminal over specific bar codes to identify the work and as tasks are performed or not performed. Such bar codes can indicate the job, operator, data, initial step or function, steps, job compilation, delays, and the like. As the work progresses, that operator, by moving the data entry terminal over the appropriate bar codings, indicates the progress on each particular work item. That information is stored in memory in that data entry terminal and, periodically during the work progress or at the work completion, the data entry terminal is fitted into a receptacle linked to a network controller and is commanded to transmit the data stored in its memory to that network controller. The entry terminal is portable to allow the operator to be mobile at his work station.

The data entry terminal provides a data flow to the network controller from each work station. The network controller provides a capability for spontaneously collecting data from the different work stations, at different entry ports, and includes memory for both handling and arranging the received information and can periodically transmit that collected data through a modem to a main frame computer. As required, a protocol converter can be provided between the modem and the main frame computer. The main frame computer, with this received information, can keep track of job or work performed at each individual work station and identify where a problem trend is occurring before that trend develops into a serious difficulty.

The data collection system of the present invention provides for a utilization of many of the formally unrealized capabilities of a main frame computer for effectively handling work operations within a shop or work area setting. In practice, it has been found that, with the utilization of the preferred components of the system of the present invention, as many as fifteen (15) work stations can be connected through a single network controller in a shop work area of approximately four hundred (400) square feet. Within such work area the system components can be operated effectively to provide an input through the network controller to a main frame computer to enable that computer to keep track of all the events or occurrences relating to job functioning at each station within that network.

BRIEF DESCRIPTION OF THE DRAWINGS

In the drawings is shown that which is presently regarded as the best mode for carrying out the invention:

FIG. 1 shows a schematic of a system flow of the present invention as involving a network controller connected to receive input from each of fifteen (15) separate stations that processes and stores that information, passing it through a standard pin coupling and through a modem and protocol converter to a main frame computer;

FIG. 1A is a work order document prepared to direct operations at each of the fifteen (15) stations of FIG. 1 prepared in English instructions with corresponding bar codes along side for reading by an optical scanner;

FIG. 2 shows a profile perspective view of a portable data entry terminal that includes an optical sensor as the optical scanner for reading the bar codes of the bar coded work order of FIG. 1A;

DETAILED DESCRIPTION

Figure 3:
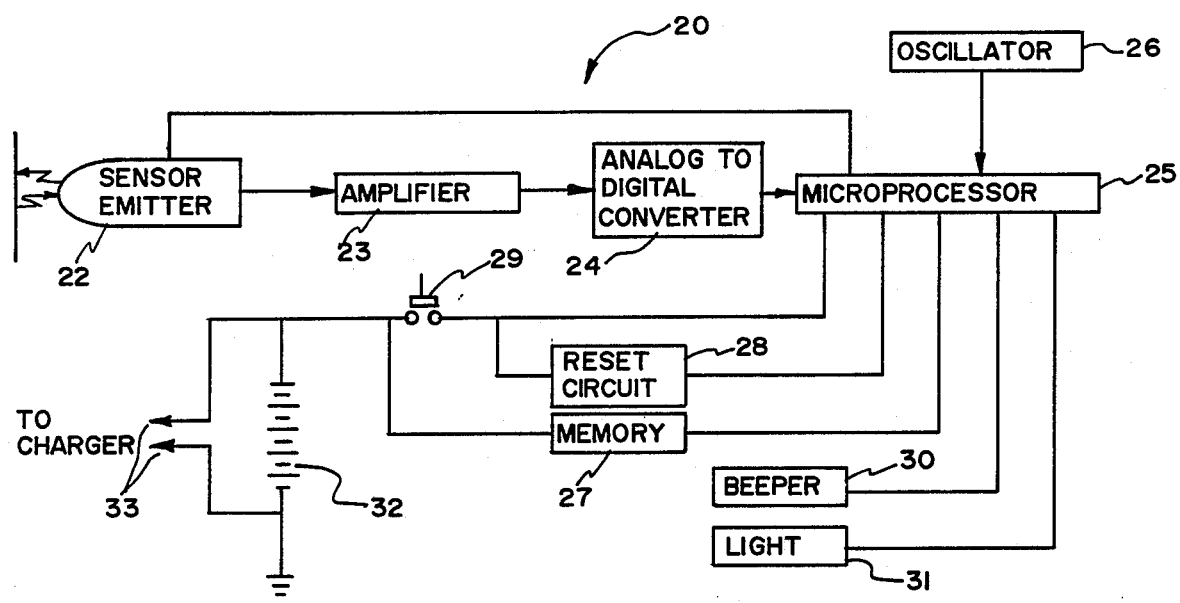
FIG. 3 is a block flow schematic of the components of the portable data entry terminal of FIG. 2.

FIG. 1 shows a schematic of the shop floor data collection system 10 of the present invention hereinafter referred to as system. The schematic illustrates a number of stations 14 identified as 1 through 15 connected by wire to pins at intervals in a block 15 that is identified as a network controller. The information is programmed as bar codes 12 on a work document 11 that are read with a data entry terminal 20, shown in FIG. 2, by an operator moving an optical scanner 21 of that data entry terminal over select bar codes. In that scanning information is received as optical pulses that can include information covering a job, operator, date, can indicate completion of each step and even work stoppages. This information is ultimately passsed, as shown in FIG. 1, to a main frame computer 19 that keeps track of the status of each work order or job being processed or handled at each work station. The work document 11 is coded in English and with bar codes 12 positioned beside each English instruction and is created by a production scheduling department or system utilizing a printer having graphics capabilities suitable for formulating embedded bar codes that are preferred as bar codes 12. Two printers that have been utilized successfully to produce the required work order document are the LIPS TM 10 Laser printer manufactured by CIE Terminals; and the M-100L Matrix printer manufactured by Dataproducts. The work document provides for the automatic collection of information about job progress and all tasks related thereto, including the job and steps in the production process.

In practice, when the work order document is received at a work station 14 by a worker operator, it is scanned with the portable data entry terminal 20 that is maintained on the person of that worker operator. The preferred portable data entry terminal 20 has the capability for storing information as it is read, and, on command, will transmit that information to the network controller 15, as will be shown and described later herein with respect to FIG. 4. The worker operator at work station 14, on receipt of the work order, with the optical sensor end 21 of the data entry terminal 20 scans the bar codes, reading therefrom as optical pulses the job, operator, date, and the first step or function, moving that optical sensor over the particular bar code adjacent to its English equivalent. Then, as steps or functions are performed, he continues to scan the bar codes on each line that is indicative of the perforamnce of that step by again moving the data entry terminal optical sensor 21 over such bar code. At any time in the process or at the job termination, the information stored in the data entry terminal memory can be transmitted, as will be set out in some detail hereinbelow, to the network controller 15 for processing and ultimate transmittal to the main frame computer 19. Also, should there be a stoppage or breakdown in the work progress, this information can also be read as a bar code.

The data terminal provides also a capability for time coding each bar code entry for ultimate transmittal to the main frame computer. At the point in time when the work is concluded or earlier, as required, the job information is passed from the sensor emitter of the data entry terminal 20 to the network controller as set out in FIG. 4 and described hereinbelow. Shown in the schematic of FIG. 1, this is preferably accomplished by placing the data entry terminal into an appropriate receptacle, illustrated as circles numbered one (1) through fifteen (15) at the stations 14. Shown therein the receptacles link, the data entry terminal through wires to the network controller 15. The data entry terminal thereby transmits the stored data from its memory into network controller 15 wherein the information is processed for serial transmission therefrom across a standard pin coupling commonly known as an RS-232C connector through a modem 17 and, as required, through a protocol converter 18, to the main frame computer 19. The main frame computer 19 is, of course, selected by the user and may, if the preferred network controller 15 cannot directly communicate therewith, require the utilization of such protocol converter 18 computer for computer language conversion. If such communication is inherently possible between the two components then such protocol converter 18 can be dispensed with. Also, no particular modem 17 is preferred with the system of the present invention. Modem selection is therefore the option of the user to provide the desired system characteristics to effectively pass information from the network controller 15 to the main frame computer 19.

It has been found that the system of the present invention works effectively where the work stations are arranged within approximately a four hundred (400) feet radius and can include up to fifteen (15) individual work stations 14 therein that are each connected to a separate input port or pin of the network controller 15. At each work station a person charged with responsibility for the production or work will have a data entry terminal 20 on their person, as shown in FIG. 2. In FIG. 2 an operator is shown holding the data entry terminal 20 to move the optical sensor end 21 thereof over the bar codes 12 of the work order 11 of FIG. 1A. So arranged, with each movement the data entry terminal sensor across a bar code, the optical sensor end 21 reproduces as optical pulses that bar code information, which optical pulses are then translated from analog to digital pulses that are then passed to memory in that data entry terminal. This pulse entry will also preferably include real time clocking. The preferred data entry terminal 20, after appropriate setting or calibrating, is capable of scanning several popular bar codes as would be appropriate for use as bar codes 12 on the work order document 11.

The network controller 15 is preferably a digital matrix switching device that includes separate ports for connecting through wires to each of the respective stations 14. The device sequentially samples each port at short time intervals, and multiplexes the samples it receives into a collecting register that will store the entered data as discrete signals. On command, that stored data can be passed to designated output ports. At such output transmission the data will preferably go through one or more modems, ultimately to main frame computer 19. The digital matrix switching arrangement of the network controller 15 preferably provides for processing information flow that it receives from each port in a short sample time period, and will transfer that input into a holding register at a rate equal to the sampling frequency, one sample at a time. The digital matrix switching arrangement also includes an arrangement for tansferring, on command, that data from the output holding register to the respective output ports. A preferred digital matrix switching arrangement will have a sampling rate that is high enough to avoid distorting the digital wave form and will provide both a (RAM) random access memory and (ROM) read only memory capabilities for storing control data, data bits representative of the desired switching arrangement and, of course, provides for accessing the RAM at times during a sample period. In practice, a preferred digital matrix switching arrangement for use as the network controller is one manufactured by Digital Products, Inc. identified as a Netcommander TM, Number NC-16/60. This unit has been found in practice to operate satisfactorily as the network controller 15 of the system 10 of the present invention.

As set out above, the function of the data entry terminal 20, shown in FIG. 2, is for reading the bar codes 12 on a work order document 11. The preferred data entry terminal is one that is portable to be easily carried in a worker operator's hand and is preferably small enough to be conveniently maintained on the operator's person as he works. The preferred data entry terminal 20 comprises: an optical sensor; a signal conditioning arrangement that is responsive to that optical sensor; a microprocessor that is responsive to the signal conditioning arrangement for processing input data sensed by that optical sensor; memory for storing that input data; and, of course, a power source. In practice, a data entry terminal manfuactured by MSI Data Corporation identified as a Datawand ® II Multiple Bar Code Scanner has been found to operate satisfactorily as data entry terminal 20.

Figure 4:
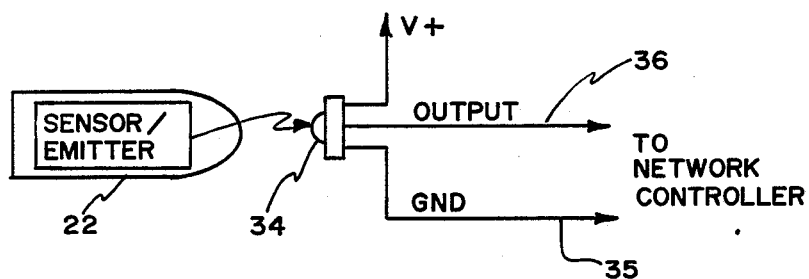
FIG. 4 is a block flow schematic of the portable data entry terminal of FIG. 2 showing the optical sensor portion being operated to transmit data from memory thereof as optical pulses to the network controller of FIG. 1.

The preferred data entry terminal 20 is shown in schematic in FIG. 3 arranged for receiving an optical pulse entry from the optical sensor 21 of FIG. 2, and for passing that data entry to a sensor emitter 22 as the operator moves that sensor emitter over the bar codes 12 of the work order 11. Shown in FIG. 3 the sensed information is transferred through an amplifier 23 and an analog to digital converter 24 to a microprocessor 25 that is clocked by an oscillator 26. Therefrom the input is passed to a memory 27. Also included with the data entry terminal 20 is a reset circuit 28 for resetting the unit between operations. The unit operates through a push button 29 and includes a beeper 30 that sounds to indicate a proper reading has been received. Also included is an indicator light 31 that is illuminated when the unit is operating. The beeper, of course, can also be used to provide an alarm to the operator when the unit is left on, or like function. Additionally, the data entry terminal 20 preferably includes a charging circuit for battery circuit 32 that is arranged to be connected to such charger by blades 33. The data entry terminal receives data as optical pulses produced by the sensor emitter 22 that distinguishes between light and dark areas in the individual bar codes. The analog to digital converter 24 then converts that analog reading to digital form for processing in the microprocessor 25 and storage in memory 27. When the work order 11 has been completed, or at another appropriate time, as illustrated in FIG. 4, that information can be transmitted back through the data entry terminal sensor emitter 22 on command. This information is read as electrical pulses at an integrated optical sensor 34 in the receptacle at each work station 24, which receptacle is shown connected to ground on the one leg 35 and includes an output line 36 for passing the collected data as electrical pulses to the network controller 15, that receives that information through one of the entry ports, shown in FIG. 1.

The structure of the preferred data entry terminal 20 is shown in FIGS. 3 and 4 and is provided by way of example to show a preferred arrangement of a data entry terminal. It should, however, be understood the system of the present invention is not limited to this particular optical reader.

The data collection system 10 of the present invention, as illustrated above, provides a capability for closely controlling a number of stations, up to fifteen

(15) in a work area or floor having a radius of approximately four hundred (400) feet linked to a main frame computer. The main frame computer receives the data input to provide an effective utilization of the inherent control capabilities of such main frame computer on the work station to include job tracking, standardizing costs, materials control, labor control, scheduling, production forecasitng, costing, and others. With the control provided by the system of the present invention, a manufacturer can be continually informed about the status of the manufacturing process at all work stations and can keep track of stoppages and solve problems before they develop into stoppages. The system, by utilizing up to fifteen (15) stations within a given work area of approximately four hundred (400) feet facilitates work handling as the arrangement maximizes the effectiveness of a work station operator within that network area.

A preferred embodiment of the present invention in a data collection system has been shown and described herein. It should however, be understood, that variations and changes may be made thereto or to the preferred components without departing from the subject matter coming within the scope of the following claims, which claims I regard as my invention.

What is claimed is:

1. A data collection system for a shop area having multiple work stations comprising, a production work order generated for each work station having job identification data, steps, and delays programmed thereon in English and corresponding bar code groupings for each work item to be produced at said work station; a portable data entry terminal means that includes optical scanning means and a self contained power supply and can store optical pulses sensed by said scanning means as digital pulses in a memory portion thereof, which portable data entry terminal means is maintained at each work station by an operator/supervisor who moves said optical scanning means over selected bar code groupings for collecting job status information; means for retrieving and transmitting data collected by said data entry terminal for transmittal to a network controller means; a network controller means for the shop area arranged to receive said data transmitted from each said data entry terminal, receiving that data sequentially or simultaneously at entry ports and provides for multiplexing said data into a collection register that store that entered data as discrete signals in a holding register for later transmittal through an output port; mode means connected for receiving said network controller means data output and transmitting it to a main frame computer means; and a main frame computer means connected to receive said data output from said modem to process and handle that information to control operations in said shop area.

2. A data collection system as recited in claim 1, wherein the shop area comprises a number of work stations within approximately a four hundred (400) foot radius.

3. A data collection system as recited in claim 2, wherein up to fifteen (15) work stations are included within the shop area.

4. A data collection system as recited in claim 1, wherein the data entry terminal has a shape to be manually operated by an operator holding it in one hand only; and the receptacle means is connected by wire to one of the data entry ports of the network controller means.

5. A data collection system as recited in claim 1, wherein the data entry terminal means is a Datawand ® II Multiple Bar Code Scanner manufactured by MSI Data Corporation.

6. A data collection system as recited in claim 1, wherein the network controller means is identified as a Netcommander ™ manufactured by Digital Products, Inc.

7. A data collection system as recited in claim 1, further including passing the data output from the network controller across an RS-232C connector.

8. A data collection system as recited in claim 1, further including passing the modem data out through a protocol converter means for translating the data form from the modem language to the computer language of the main frame computer means.

* * * * *